July 19, 1960    H. W. POPE ET AL    2,945,380
INERTIAL GUIDANCE DEVICE
Filed Oct. 2, 1957    3 Sheets-Sheet 1
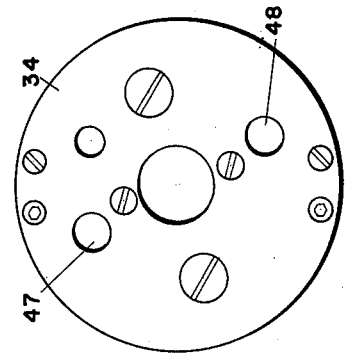
Fig. 5
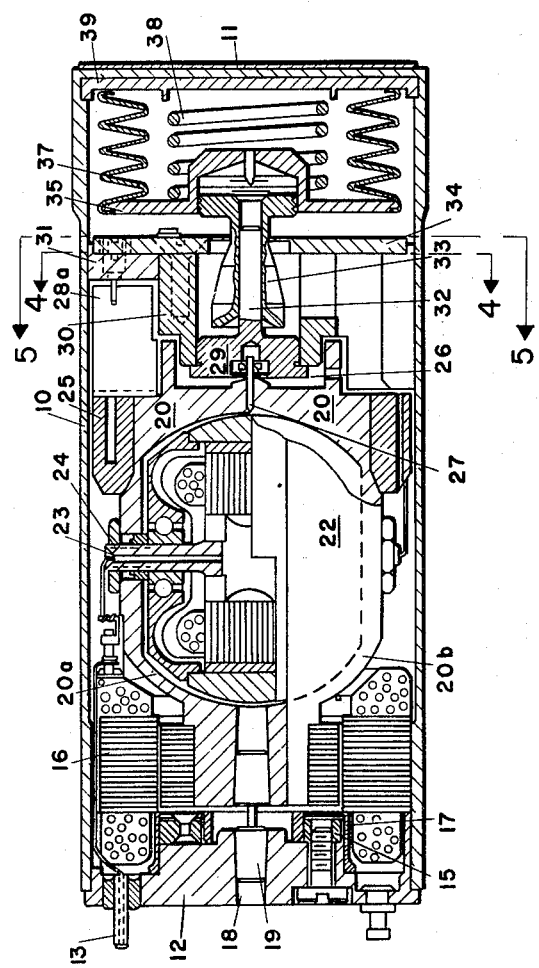
Fig. 1
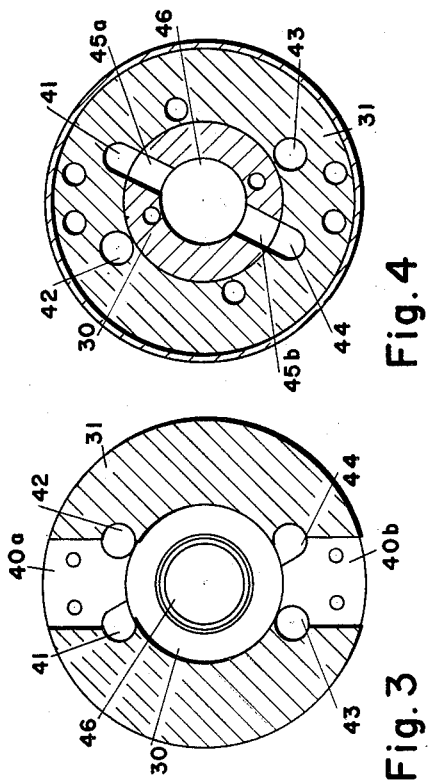
Fig. 4
Fig. 3
Harold W. Pope
Paul F. Hayner
Richard B. Henderson
*INVENTORS*

July 19, 1960

H. W. POPE ET AL 2,945,380

INERTIAL GUIDANCE DEVICE

Filed Oct. 2, 1957

Harold W. Pope
Paul F. Hayner
Richard B. Henderson
INVENTORS

Harold W. Pope
Paul F. Hayner
Richard B. Henderson
*INVENTORS*

United States Patent Office 2,945,380
Patented July 19, 1960

2,945,380

INERTIAL GUIDANCE DEVICE

Harold W. Pope, Paul F. Hayner, and Richard B. Henderson, Nashua, N.H., assignors to Sanders Associates, Inc., Nashua, N.H., a corporation of Delaware Filed Oct. 2, 1957, Ser. No. 687,791

7 Claims. (Cl. 74—5.5)

This invention relates generally to inertial guidance devices and, more particularly, to such devices as gyroscopes and accelerometers as employed in modern aircraft, guided missiles and the like. It is particularly directed to an improved rate gyroscope which is of exceedingly small size, while at the same time having improved performance relative to similar instruments of equal or larger size. The invention is particularly concerned with maintaining gimbal damping substantially constant over a wide temperature range.

In the past few years there has been a movement to drastically reduce the size and weight of inertial guidance devices such as gyros and accelerometers and to provide extremely small and compact devices of high precision. Devices of the latter type have been fully described in widely circulated literature. For example, one of these devices is described in a companion application Serial No. 391,981, entitled "Gyroscope." In taking steps to reduce the size and weight of, for example, gyros, many complex problems have been encountered. Satisfactory solutions for some of these problems are still being sought. One of the important problems for which better solutions are constantly being sought is the problem of adequately damping oscillatory effects produced by the natural resonant frequency of the gimbal and gimbal mounting. The gimbal has a dominant resonance mode which results primarily from the moment of inertia about the output axis of all gimbal gyro parts acting against the torsion bar constraint. This dominant resonance is the natural frequency of the gimbal and gimbal assembly. Unless spurious output signals are to be suffered, the motion caused by this frequency must be damped. Critical damping is effected when the energy stored as a result of the resonance equals that dissipated by the damping in each cycle of oscillation. In other words, the damping energy is equal and opposite to the resonant energy. Perfect critical damping is seldom effected without a tendency to over damp resulting in a lowering of the frequency response of the gyro. From experience, the most satisfactory damping occurs if there is a ratio between the actual damping and critical damping of approximately 0.5, provided this ratio remains constant over the temperature range of operation of the gyro. The ratio of actual damping to critical damping is known as the damping ratio. This term is used hereinafter.

In the companion application Serial No. 391,981, a damping device is described. For all but the most critical applications the damping effected by this device, though not constant over the temperature range, is adequate. This damping is indicated by curve A in Fig. 9. As stated above, for more precise control relatively constant damping near the critical damping level is desired. The improved damping system disclosed herein provides nearly the ultimate in damping control, both with respect to constance over the temperature range and nearly critical damping. This is evidenced by curve B of Fig. 9, a curve prepared from actual damping measurements on a rate gyroscope utilizing the novel and improved damping system.

It is therefore an object of the present invention to provide an improved damping system for inertial guidance devices.

It is also an object of the present invention to provide an improved damping system for inertial guidance devices which is relatively simple in both manufacture and operation.

In addition, it is an object of the present invention to provide an improved damping system for inertial guidance devices which provides substantially constant damping over the temperature range of operation of the device.

In accordance with the present invention there is provided an inertial guidance device having a member whose motion with respect to an axis provides an indication of movement of the device with respect to a set of reference coordinates. The member has a natural resonant frequency requiring damping. The device also includes a housing for the member supporting it for motion with respect to the axis and a viscous fluid in the housing in contact with the member for damping motion of the member resulting from the natural frequency. The fluid is subject to viscosity changes with changes in temperature. The device also includes a pumping means coupled to the member for movement with the member in relation to the above-mentioned axis and against the constraint of the fluid. Further, the device includes a chamber in the housing which mates with the pumping means for constraining the fluid against motion of the pumping means and includes a fluid passageway connected to the chamber for controlling the flow of the fluid from the chamber in response to motion of the pumping means. Finally, the device includes an expansible volume compensating device within the housing having an end member movable along an axis in accordance with temperature variation. A piston is coupled to the end member for movement therewith along the second axis. The piston has a control surface so shaped that motion of the piston into the fluid passageway in accordance with temperature changes varies the effective opening thereof substantially in accordance with the inverse of the viscosity versus temperature relation, thereby to minimize the effects of variation in the viscosity of the fluid and maintains a constant damping characteristic over a predetermined temperature range. In addition, guide means are coupled to the housing for maintaining the piston concentric with the axis at all times while permitting the piston to translate along the axis.

For a better understanding of the present invention, together with other and further objects thereof, reference is made to the following description taken in connection with the accompanying drawings and its scope will be pointed out in the appended claims.

In the drawings:

Fig. 1 is an enlarged, side elevation view, partly in section, of a rate gyroscope embodying the present invention;

Fig. 3 is a detail end view of one of the components of the improved damping system;

Fig. 4 is a detail view of the opposite end of the components of Fig. 3;

Fig. 5 is a detail view of an end cap which covers the Fig. 4 end of the components represented in Figs. 3 and 4;

Figure 7:
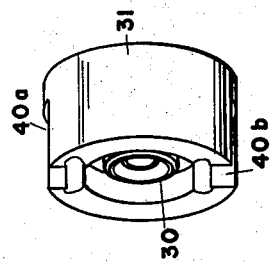
Figs. 6 and 7 are side, perspective views of the component of Figs. 3 and 4.
Figure 6:
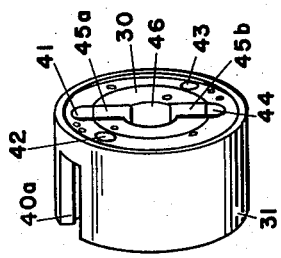
Figure 2:
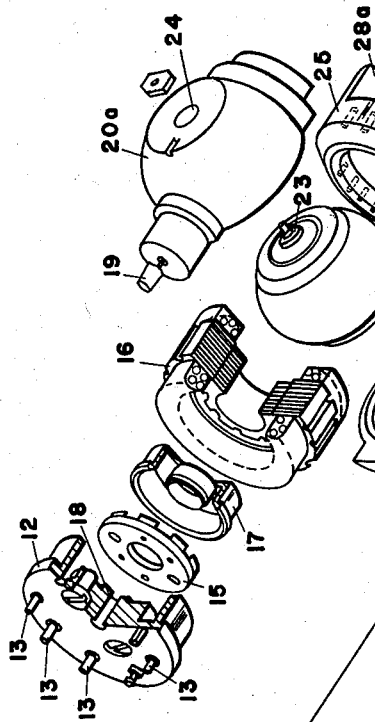
Fig. 2 is a perspective view of the component parts of the gyroscope of Fig. 1 shown partly in section in exploded form in the order of their assembly to each other.

*General description and explanation of operation of gyro as represented by Figs. 1 and 2*

Referring now to the drawings, and particularly to Figs. 1 and 2, the improved gyro includes a housing 10 as represented in Fig. 1 having end caps 11 and 12. The housing 10 is generally of cylindrical form and the end caps 11 and 12 are secured to the housing to effect an hermetic seal in any suitable fashion. The end cap 12, as shown in more detail in Fig. 2, includes electrical terminals 13 and null-adjusting screws 14. Set in the end cap 12 and coupled to the adjusting screws 14 is a null-adjusting ring 15 which cooperates with a pick-off winding 16 through a sealing piece 17 of non-magnetic material. The end cap 12 also includes a tapered hole 18 for receiving and clamping one end of a tapered torsion bar 19 mounted in one half 20a of a gimbal 20, the member 20b providing the other half of the gimbal. The gimbal 20 encloses a high-speed motor 22 having one bearing 23 mounted in the aperture 24 of the gimbal section 20a and a similar bearing, not shown, mounted in a similar hole in the gimbal section 20b. Wiring for the motor 22, visible in Fig. 1, passes through selected ones of the terminals 13, the housing and the shaft supported by the bearing 23. To provide the gyroscopic effect the motor 22 rotates at extremely high speeds, for example, 24,000 r.p.m. and the gimbal 20 is free to rotate slightly, under constraint, on the axis through the torsion bar 19.

The two sections 20a and 20b of the gimbal are soldered together, evacuated and then filled with helium. The pick-up winding 16 is then pressed onto one side and a paddle ring 25 on the other side. The end of the gimbal 20 on which the ring 25 is pressed includes a cylindrical recess 26, in which a pivot pin 27 is centrally located and attached to the frame of the gimbal half 20a.

The paddle member 25 is of metallic construction, preferably aluminum or comparable light-weight material to provide a minimum moment of inertia about the output axis, and includes on one surface paddles 28a and 28b diametrically opposed. A bearing housing 29, including a jewel bearing 21, is mounted on the pin 27 and clamped in rigid position with respect to the housing 10 and other stationary members of the gyro by a press fit into a metallic insert 30, which is in turn tightly fitted in a damping block 31. Fig. 1 indicates the press fit assembly of the members 29, 30 and 31.

An elongated pin 32 on the non-bearing end of the bearing member 29 is inserted through the central axis of a piston 33 to permit longitudinal sliding motion of the piston. The piston occupies the central cavity of the insert 30 and extends through a centrally located hole in a cover 34 which is securely affixed to the end surfaces of the members 30 and 31. The piston 33 is also threaded into an end plate 35 of a bellows 36 comprising a flexible material 37 impervious to the viscous fluid and sealed at one end by the end cap 35 and at the opposite end by another end cap 39. The bellows includes a spring 38, enclosed by the flexible material 37, acting against the end caps 35 and 39 to minimize shock effects on the bellows.

The utilization of the elements 25—29, 30, 31, 33 and 34, comprising an improved damping system, are novel in the gyro being described with respect, for example, to the similar gyro described in copending application Serial No. 391,981. As explained in that application, the gyro housing is completely filled with a suitable viscous fluid and is hermetically sealed. As the gyro operates over a wide range of temperatures, for example, −20 to +85° C., there is not only expansion and contraction of the metallic members but also change in the viscosity of the fluid. Expansion and contraction of the motor 22 with relation to its bearings is compensated for by utilizing special bearing housings as more fully described in copending application Serial No. 407,892. Expansion and contraction of the gimbal 20 is compensated for by providing for slight longitudinal movement between the jewel bearing 21, rigidly mounted in the member 29, and the pivot pin 27, rigidly coupled to the gimbal section 20. Further expansion and contraction effects on the volume of fluid are compensated for by the motion of the bellows 36. The change in viscosity of the fluid, resulting in variation in damping effect on the gimbal 20, is a problem solved by the new improved damping system including the members 25, 30, 31, 33 and 34. The details of operation of this damping system will be described more fully hereinafter.

The gyroscopic action of the gyro is accomplished in the following manner. The high-speed rotation of the motor 22 provides the high inertia mass and a reference axis. Gimbal 20 is free, under some constraint, to rotate about an axis through the torsion bar 19 and the jewel bearing 21 in the bearing retainer 29. Motion of the gyro housing about an axis at right angles to the motor axis and to the axis through the torsion bar 19 and retainer 29 will produce some rotation of the gimbal about its axis. The electrical pick-off, providing a signal proportional to the gimbal motion, is essentially a differential transformer including the ferromagnetic pieces 15 and 16. Motion of the member 16 with respect to the member 15 results in a signal in the windings of the member 16 which signal appears on selected ones of the terminals 13.

*Detail description and explanation of operation of the improved damping system*

As previously stated herein the gimbal assembly has a natural frequency which should be damped in order to reduce spurious signal effects. In general, the damping is effected by providing a paddle ring 25 which rotates with movement of the gimbal causing the paddles 28a and 28b to move the viscous fluid in the damping block 31. By maintaining the reaction of the fluid on the paddles 28a and 28b substantially constant the desired damping ratio is obtainable. If the fluid maintained the same viscosity over the operating temperature range of the gyro, the damping problem would thus be simply solved by selection of fluid of proper viscosity. However, the fluid does not maintain constant viscosity and, therefore, continuous compensation must be effected. The fluid must be controlled to produce substantially the same reaction against the paddles 28a and 28b regardless of change in viscosity and regardless of the operating temperature of the gyro. In general, this is effected by controlling the rate of flow of the fluid from and to the chambers 40a and 40b in the damping block 31 in which the paddles 28a and 28b cooperate with the fluid to provide the damping. These chambers are visible in Figs. 2, 5, 6 and 7. The members 30 and 31 provide passageways for the fluid from the pressure to the non-pressure sides of a paddle, while the piston 33 provides a device for providing a variable orifice in the passageways for the fluid when passing from a pressure to a non-pressure side of the paddle. The position of the piston 33 in the central orifice of the insert 30 is determined by the degree of extension or contraction of the bellows 36 brought about by variations in temperature. The details of the manner in which the members 25, 30, 31 and 33 cooperate to effect the desired result will be better understood by referring to Figs. 3–8, inclusive.

Figure 8:
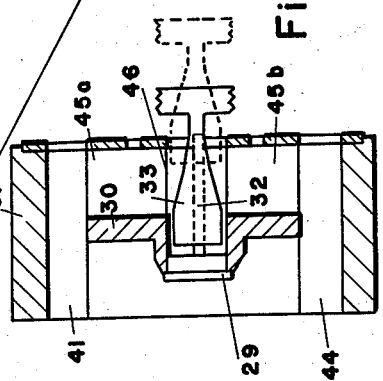
Fig. 8 is an enlarged, side elevation view, in section, of the principal components of the improved damping system.

The members 30 and 31 providing the passageways for the fluid moved by the paddles 28a and 28b are shown in other views in Figs. 3 and 5–8, inclusive. The damping block 31 includes a pair of paddle chambers 40a and 40b. As shown in Fig. 3, presenting a view of the end of the members 30 and 31 facing the paddles 28a and 28b, the paddle chambers 40a and 40b include fluid flow passages 41, 42, 43 and 44. As seen in Fig. 4, representing the other end of the members 30 and 31, the passages 41 and 44 are connected by a slot 45 cut in the faces of the members 30 and 31 while the passages 42 and 43 are not connected within the member 30, 31 or 34 but by an external path. The piston 33 occupies a cylindrical bore 46 through the center of the member 30 and its longitudinal position controls the flow between passages 41 and 44 by varying the size of the flow path around the piston and across the central bore 46. In Fig. 5, the end cap 34 is shown as placed over the ends of the members 30 and 31 represented in Fig. 4. Ports 47 and 48 mate with the ports 42 and 43 of the member 31, to provide for flow of the fluid from the ports 42 and 43 into the area of the gyro housing 10 occupied by the bellows 36. The piston 33, having a generally conical form as indicated in Figs. 2 and 8, moves longitudinally in the central bore 46 of the member 30 and that of the end cap 34. Extreme positions for the piston 33 are visible in Fig. 8, which is a vertical, side section through the members 30 and 31 along the plane of the slot 45. As seen in Figs. 1 and 8, the end of the bore 46 in the vicinity of the gimbal is sealed by the bearing housing 29. An explanation of the manner in which this piston operates to control the flow of the viscous fluid should now be readily understandable.

As the paddles 28a and 28b rotate in the chambers 40a and 40b fluid is forced through one pair of the diagonally opposed passages 41–44, inclusive, and flows into the other pair of these passages. In other words, flow occurs between the pressure and non-pressure sides of the paddles. Assume that the fluid is being forced through the passages 42 and 43. It flows through these passages and the ports 47 and 48 in the end plate 34 into the area housing the bellows 36. Fluid from the bellows area flows through the central port of the end cap 34, across the slot 45 in the surface of the members 30 and 31, through the passages 41 and 44 and back to the non-pressure side of the paddles 28a and 28b. It is apparent that part of the flow path, that is, the part through the central port in the end cap 34 and across the slot 45 in the face of the members 30 and 31 is valved by the position of the piston 33. Since this piston has a conical shape, the large diameter section of the piston will restrict the flow, while the smaller diameter section will permit substantially free flow. Varying degrees of restriction of flow, to cause proper back pressure on the paddles, are employed as the viscosity of the fluid changes with temperature. Temperature also acts to position the piston through the medium of the bellows 36.

Figure 9:
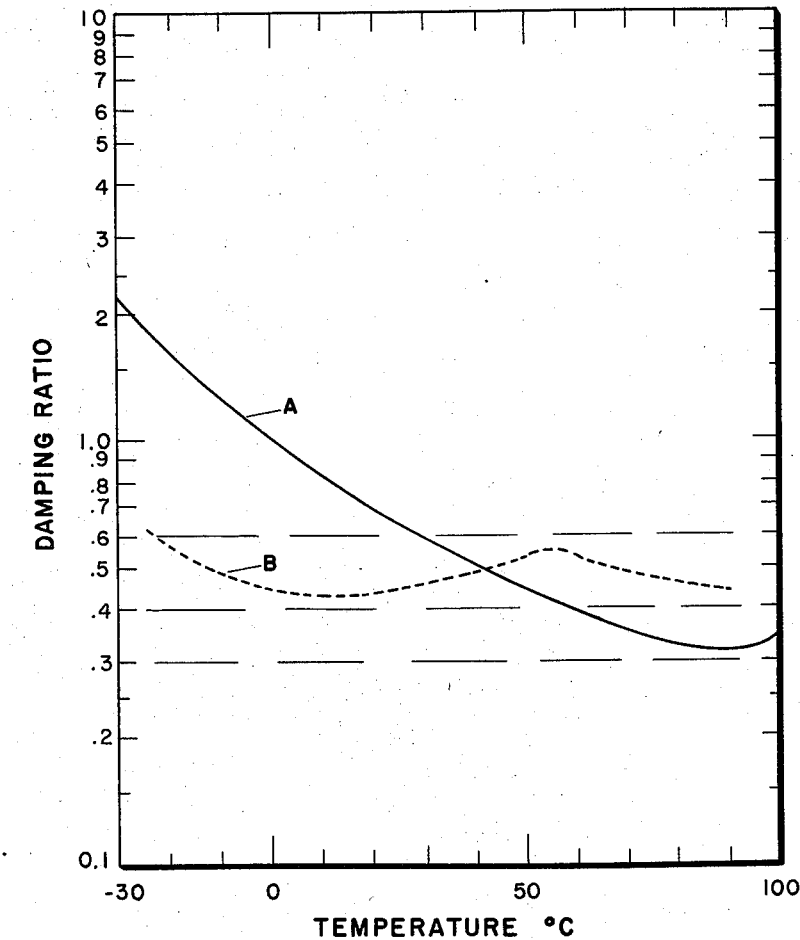
Fig. 9 is a graph showing the effectiveness of the damping compensation.

The effectiveness of the improved damping system is well represented by the graph of Fig. 9. The graph is a plot of the desired damping ratio versus temperature. It is to be remembered, as previously discussed herein, that a constant damping ratio of less than 1 is desired and preferably a ratio of 0.5. Curve A represents the damping effectiveness of prior gyros of superior quality. With respect to this curve, it should be noted that operation between approximately 30° C.–100° C. is highly satisfactory. However, below 30° the ratio rises rapidly, resulting in over damping and a lowering of the frequency response of the gyro. Curve B represents the damping effectiveness of the system described herein. It is seen that nearly perfect compensation is effected over the operating range of −20° to +100° C.

While applicant does not intend to be limited to any particular shapes or sizes of parts, or material used in the embodiment of the invention just described, there follows a set of parameters for the more important components which have been found to be particularly suitable.

Length and width of paddles 28 _____ 0.35" long, 0.17" wide.
Maximum rotation of paddles 28 _____ 2.6°.
Diameters of parts 41–44, inclusive _____ ⅛";
Depth and width of slot 45 ___ ⅛" x .209.
Maximum and minimum diameter of piston 33 _____ .19" max., .08" min.
Length of piston 33 _____ 0.45".
Travel of piston 33 _____ 0.2".

While there have been hereinbefore described what are at present considered preferred embodiments of the invention, it will be apparent that many and various changes and modifications may be made with respect to the embodiments illustrated, without departing from the spirit of the invention. For example, the gimbal of the gyro described herein may be replaced by a cylindrical unbalanced mass pivoted as is the gimbal and providing by degree of rotation a measure of acceleration. It will be understood, therefore, that all such changes and modifications as fall fairly within the scope of the present invention, as defined in the appended claims, are to be considered as a part of the present invention.

What is claimed is:

1. An inertial guidance device, comprising: a member whose motion with respect to an axis provides an indication of movement of said device with respect to a set of reference co-ordinates, said member having a natural resonant frequency requiring damping; a housing for said member for supporting it for motion with respect to said axis; a viscous fluid within said housing in contact with said member for damping motion of said member resulting from said natural frequency, said fluid being subject to viscosity changes and changes in temperature; a pumping means coupled to said member for movement with said member in relation to said axis against the restraint of said fluid; a chamber in said housing mating with said pumping means for constraining said fluid against motion of said pumping means; a fluid passageway connected to said chamber for controlling flow of said fluid from said chamber in response to motion of said pumping means; an expansible volume compensating device within said housing having an end member movable along an axis in accordance with temperature variations; a piston coupled to said end member for movement therewith along the second said axis, said piston having a control surface so shaped that motion of said piston into said fluid passageway, in accordance with temperature changes varies the effective opening thereof substantially in accordance with the inverse of the viscosity versus temperature relation, thereby to minimize the effects of variations in the viscosity of said fluid and maintain a constant damping characteristic over a predetermined temperature range; and guide means coupled to said housing for maintaining said piston concentric with said axis at all times while permitting said piston to translate along said axis.

2. An inertial guidance device, comprising: a member whose motion with respect to an axis provides an indication of movement of said device with respect to a set of reference co-ordinates, said member having a natural resonant frequency requiring damping; a housing for said member for supporting it for motion with respect to said axis; a viscous fluid within said housing in contact with said member for damping motion of said member resulting from said natural frequency, said fluid being subject to viscosity changes and changes in temperature; a paddle coupled to said member for movement with said member in relation to said axis against the restraint of said fluid; a chamber in said housing mating with said paddle for constraining said fluid against motion of said paddle; a fluid passageway connected to said chamber for controlling flow of said fluid from said chamber in response to motion of said paddle; an expansible volume compensating device within said housing having an end member movable along an axis in accordance with temperature variation; a piston coupled to said end member for movement therewith along the second said axis, said piston having a control surface so shaped that motion of said piston into said fluid passageway, in accordance with temperature changes varies the effective opening thereof substantially in accordance with the inverse of the viscosity versus temperature relation, thereby to minimize the effects of variations in the viscosity of said fluid and maintain a constant damping characteristic over a predetermined temperature range; and guide means coupled to said housing for maintaining said piston concentric with said axis at all times while permitting said piston to translate along said axis.

3. An inertial guidance device, comprising: a member whose motion with respect to an axis provides an indication of movement of said device with respect to a set of reference co-ordinates, said member having a natural resonant frequency requiring damping; a housing for said member for supporting it for motion with respect to said axis; a viscous fluid within said housing in contact with said member for damping motion of said member resulting from said natural frequency, said fluid being subject to viscosity changes and changes in temperature; diametrically opposed paddles coupled to said member for movement with said member in relation to said axis against the restraint of said fluid; diametrically opposed chambers in said housing mating with said paddles for constraining said fluid against motion of said pumping means; a fluid passageway communicating with said diametrically opposed chambers for controlling flow of said fluid from said chambers in response to motion of said paddles; an expansible volume compensating device within said housing having an end member movable along an axis in accordance with temperature variations; a piston coupled to said end member for movement therewith along the second said axis, said piston having a control surface so shaped that motion of said piston into said fluid passageway, in accordance with temperature changes varies the effective opening thereof substantially in accordance with the inverse of the viscosity versus temperature relation, thereby to minimize the effects of variations in the viscosity of said fluid and maintain a constant damping characteristic over a predetermined temperature range; and guide means coupled to said housing for maintaining said piston concentric with said axis at all times while permitting said piston to translate along said axis.

4. An inertial guidance device, comprising: a member whose motion with respect to an axis provides an indication of movement of said device with respect to a set of reference co-ordinates, said member having a natural resonant frequency requiring damping; a housing for said member for supporting it for motion with respect to said axis; a viscous fluid within said housing in contact with said member for damping motion of said member resulting from said natural frequency, said fluid being subject to viscosity changes in temperature; a pumping means coupled to said member for movement with said member in relation to said axis against the restraint of said fluid; a cylindrical damping block having a chamber mating with said pumping means for constraining said fluid against motion of said pumping means; a first fluid passageway in said damping block coupling said chamber and said housing, and a second fluid passageway coupling said chamber and said housing co-operating with said first fluid passageway for controlling flow of said fluid from said chamber in response to motion of said pumping means; an expansible volume compensating device within said housing having an end member movable along an axis in accordance with temperature variations; a piston coupled to said end member for movement therewith along the second axis, said piston having a control surface so shaped that motion of said piston into said first fluid passageway, in accordance with temperature changes varies the effective opening thereof substantially in accordance with the inverse of the viscosity versus temperature relation, thereby to minimize the effects of variations in the viscosity of said fluid and maintain a constant damping characteristic over a predetermined temperature range; and guide means coupled to said housing for maintaining said piston concentric with said axis at all times while permitting said piston to translate along said axis.

5. An inertial guidance device, comprising: a member whose motion with respect to an axis provides an indication of movement of said device with respect to a set of reference co-ordinates, said member having a natural resonant frequency requiring damping; a housing for said member for supporting it for motion with respect to said axis; a viscous fluid within said housing in contact with said member for damping motion of said member resulting from said natural frequency, said fluid being subject to viscosity changes and changes in temperature; a pumping means coupled to said member for movement with said member in relation to said axis against the restraint of said fluid; a chamber in said housing mating with said pumping means for constraining said fluid against motion of said pumping means; a fluid passageway connected to said chamber for controlling flow of said fluid from said chamber in response to motion of said pumping means; an expansible volume compensating device within said housing having an end member movable along an axis in accordance with changes in volume of component parts within said housing; a piston coupled to said end member for movement therewith along the second said axis, said piston having a control surface so shaped that motion of said piston into said fluid passageway, in accordance with temperature changes varies the effective opening thereof substantially in accordance with the inverse of the viscosity versus temperature relation, said piston motion tending to restrict the flow of said fluid to and from said pumping means chamber, thereby to minimize the effects of variations in the viscosity of said fluid and maintain a constant damping characteristic over a predetermined temperature range; and guide means coupled to said housing to maintain said piston concentric with said axis at all times while permitting said piston to translate along said axis.

6. An inertial guidance device, comprising: a member whose motion with respect to an axis provides an indication of movement of said device with respect to a set of reference co-ordinates, said member having a natural resonant frequency requiring damping; a housing for said member for supporting it for motion with respect to said axis; a viscous fluid within said housing in contact with said member for damping motion of said member resulting from said natural frequency, said fluid being subject to viscosity changes and changes in temperature; a pumping means coupled to said member for movement with said member in relation to said axis against the restraint of said fluid; a chamber in said housing mating with said pumping means for constraining said fluid against motion of said pumping means; a fluid passageway connected to said chamber for controlling flow of said fluid from said chamber in response to motion of said pumping means; an expansible bellows adjacent one end of said member within said housing; resilience means disposed within said bellows exerting pressure against the ends thereof causing said bellows to expand and contract with changes in volume of component parts within said housing; a piston coupled to said end member for movement therewith along the second said axis, said piston having a control surface so shaped that motion of said piston into said fluid passageway, in accordance with temperature changes varies the effective opening thereof substantially in accordance with the viscosity versus temperature relation, thereby to minimize the effects of variations in the viscosity of said fluid and maintain a constant damping characteristic over a predetermined temperature range; and guide means coupled to said housing to maintain said piston concentric with said axis at all times while permitting said piston to translate along said axis.

7. An inertial guidance device, comprising: a member whose motion with respect to an axis provides an indication of movement of said device with respect to a set of reference co-ordinates, said member having a natural resonant frequency requiring damping; a housing for said member for supporting it for motion with respect to said axis; a viscous fluid within said housing in contact with said member for damping motion of said member resulting from said natural frequency, said fluid being subject to viscosity changes and changes in temperature; a pumping means coupled to said member for movement with said member in relation to said axis against the restraint of said fluid; a chamber in said housing mating with said pumping means for constraining said fluid against motion of said pumping means; a fluid passageway connected to said chamber for controlling flow of said fluid from said chamber in response to motion of said pumping means; an expansible bellows within said housing having an end affixed to said housing, an end member movable along an axis, a resilience means disposed within said bellows exerting pressure against said end member, in accordance with changes in volume of component parts within said housing; a piston coupled to said end member for movement therewith along the second said axis, said piston having a control surface so shaped that motion of said piston into said fluid passageway, in accordance with the temperature changes varies the effective opening thereof substantially in accordance with the inverse of the viscosity versus temperature relation, said piston motion tending to restrict the flow of said fluid from said pumping means chamber, thereby to minimize the effects of variations in the viscosity of said fluid and maintain a constant damping characteristic over a predetermined temperature range; and guide means coupled to said housing to maintain said piston concentric with said axis at all times while permitting said piston to translate along said axis.

References Cited in the file of this patent

UNITED STATES PATENTS

| | | |
|---|---|---|
| 2,043,465 | Clifford | June 9, 1936 |
| 2,090,401 | Mays | Aug. 17, 1937 |
| 2,805,577 | Shomphe | Sept. 10, 1957 |
| 2,864,256 | Hoagens et al. | Dec. 16, 1958 |